United States Patent
Cutler (10) Patent No.: US 9,747,782 B2
(45) Date of Patent: Aug. 29, 2017

(54) WIRED DATA COMMUNICATIONS NETWORK

(71) Applicant: Apollo Fire Detectors Limited, Hampshire (GB)

(72) Inventor: Jeff Cutler, Hampshire (GB)

(73) Assignee: Apollo Fire Detectors Limited, Hampshire (GB)

( * ) Notice: Subject to any disclaimer, the term of this patent is extended or adjusted under 35 U.S.C. 154(b) by 152 days.

(21) Appl. No.: 14/428,774

(22) PCT Filed: Mar. 13, 2013

(86) PCT No.: PCT/GB2013/050617
§ 371 (c)(1),
(2) Date: Mar. 18, 2015

(87) PCT Pub. No.: WO2014/045006
PCT Pub. Date: Mar. 27, 2014

(65) Prior Publication Data
US 2015/0221210 A1    Aug. 6, 2015

(30) Foreign Application Priority Data
Sep. 19, 2012  (GB) .................................. 1216733.4

(51) Int. Cl.
*G08B 26/00* (2006.01)
*H04L 12/403* (2006.01)
*H04L 29/08* (2006.01)

(52) U.S. Cl.
CPC ......... *G08B 26/008* (2013.01); *G08B 26/004* (2013.01); *H04L 12/403* (2013.01); *H04L 67/12* (2013.01); *G08B 26/006* (2013.01)

(58) Field of Classification Search
CPC .... G08B 25/00; G08B 25/003; G08B 25/007; G08B 26/00; G08B 26/004; G08B 26/006;
(Continued)

(56) References Cited

U.S. PATENT DOCUMENTS 5,559,502 A   9/1996  Schutte
6,744,348 B2  6/2004  Marino et al.
(Continued)

FOREIGN PATENT DOCUMENTS

EP   0218558   4/1987
EP   0929057   7/1999
(Continued)

*Primary Examiner* — Brian Wilson
(74) *Attorney, Agent, or Firm* — Patti & Malvone Law Group, LLC (57) ABSTRACT

A wired data communications network for use in a building for the detection of fire or intrusion, the network including a control unit connected by cable to a series of uniquely addressable transducers for the transmission and reception of data in a polling signal. Each transducer has a memory for control data and for its own unique address and responds to a predetermined start voltage pulse in the polling signal to clear its memory and then responds to control data and address data in the polling signal to store the control data when the address matches its own address and transmit data to the control unit representative of its own status. At least one of the transducers determines whether the control data is extended data and, if so, stores the extended control data and the further control data, and performs the said transmission of data to the control unit and any other process dictated by the extended control data.

12 Claims, 6 Drawing Sheets

(58) Field of Classification Search
CPC ...... G08B 26/008; G08B 27/00; G08B 29/00; H04L 12/403; H04L 67/12
USPC ............... 340/3.1, 3.5, 3.51, 3.54, 3.55, 9.1, 340/FOR. 207, FOR. 208, FOR. 321
See application file for complete search history.

(56) References Cited

U.S. PATENT DOCUMENTS

2005/0108454 A1   5/2005   Baker et al.
2011/0001978 A1   1/2011   Smilde et al.

FOREIGN PATENT DOCUMENTS

| GB | 2178878 | | 2/1987 | | |
|---|---|---|---|---|---|
| GB | 2178878 | A * | 2/1987 | ........... | G08B 26/002 |
| GB | 2279529 | | 1/1995 | | |
| GB | 2279539 | | 1/1995 | | |
| GB | 2476587 | | 6/2011 | | |
| JP | GB 2476587 | A * | 6/2011 | ........... | G08B 25/007 |
| WO | 88/08586 | | 11/1988 | | |
| WO | 2011007115 | | 1/2011 | | |

* cited by examiner

| | Data Section | Cu to Tu | Cu to Tu | Tu to Cu |
|---|---|---|---|---|
| | Voltage and Current pulses | Start Pulse | Sent Data | Received Data |
| A | | \| | ○ | n/a |
| B | | \| | \| | n/a |
| C | | ○ | ○ | n/a |
| D | | ○ | \| | n/a |
| E | | ○ | n/a | ○ |
| F | | ○ | n/a | \| |

WIRED DATA COMMUNICATIONS NETWORK

This invention relates to a wired data communications network for use in a building for the detection of fire or intrusion or other conditions. It also relates to a transducer for use on such a network, and to a method of use of the network. It is especially, but not exclusively, useful in fire alarm systems with sounders and detectors, or combined sounder/detectors, linked by a common network cable, typically a fireproof cable connected to a control panel. The invention is also applicable to security systems such as intruder alarm systems, and it may be used to control emergency lighting systems and other building management systems. Data transmission systems embodying the invention may be used to monitor a building for events and to signal to occupants that an event has occurred; the system may additionally perform building control functions to minimize the risk to building occupants from the event that has been detected. Transceiver units in the system monitor the environment parameters associated with the events, such as smoke or heat associated with a fire. They broadcast the events by sending a signal representative of the status, for example that they have sensed a fire. The system may include transducers that are able for example to emit sound and/or light in predetermined patterns. The building control functions are controlled by transceiving units which are capable of switching volt-free contacts or monitored power supplies.

As disclosed for example in our patent application GB2178878, a fire alarm system may monitor several sensing, signalling and switching transceiver units such as smoke detectors, heat detectors, combustion gas detectors or multisensor detectors and the like, connected by a transmission path which consists of two wires in a cable. These two wires are used to supply power and to transmit digital data.

There is a tendency for buildings to required larger monitoring systems and more advanced transceiver units which require higher performance transmission system functions. Such functions may be needed to improve the capability of the system, such as to include more device addresses, more sensor information and higher speed data transfers. Transmission system functions need to be updated in order to accommodate new devices onto the system, such as new types of multisensor detector, multiple output switching units, text repeaters, lighting controllers and security devices.

One approach for updating the transmission systems so as to accommodate increased message lengths is disclosed in GB2476587A. An alternative approach is to introduce an entirely new messaging system.

For wired data communications networks in which a transmission system is used between a control unit and several transceivers, several issues arise. System response time is important and so increasing message length is undesirable. Fireproof cable does not have good transmission characteristics and the necessary lengths are typically very great. When adding new transceiving units to the system, it is important that they should not have a transmission failure before the legacy devices, i.e. the older devices already installed. A typical system may for example have a mixture of perhaps a hundred different varieties of transceiving units that are compatible with the existing transmission system and its data transfer protocol, i.e. the data format of the polling signal that is transmitted on the network between the control unit and the transceiving devices. Each transceiving unit represents a considerable investment in development costs and in obtaining worldwide type approval. Many transceiving units are designed by entities different from the designer of the control unit, and the transceiving units may not readily be interchangeable. Transceiving units need to be available for servicing and spares and thus must be available for the life of the system which is typically ten years or more.

Accordingly, care has to be taken when introducing a new transmission system or protocol, which has new transmission system functions. For the reasons given above, it is desirable to maintain full compatibility with existing products i.e. with legacy control units and legacy transceiving units. Accordingly, legacy transceiving units have to be able to interpret the complete message correctly, even when the format is updated for new transmission system functions. Legacy transceiving units must also respond when they are required to respond. They must not respond when they are not required to respond, i.e. transmissions intended only for new devices must not inadvertently activate legacy devices to cause them to corrupt the transmission. Transmission times must also be maintained, and cable drive capability must be maintained between new and legacy transmission units.

The purpose of the present invention is to provide a wired data communications network capable of recognising a larger number of unique addresses for the transceivers or other devices on the network, whilst maintaining forward and backward compatibility between new and old devices.

Accordingly, the present invention provides a wired data communications network for use in a building for the detection of fire or intrusion, comprising a control unit connected by cable to a series of uniquely addressable transducers for the transmission and reception of data in a polling signal, wherein each transducer has a memory for control data and for its own unique address and is configured to respond to a predetermined start voltage pulse in the polling signal to clear any control data stored in its memory and then to respond to control data and address data in the polling signal to compare the address data with its own address and to store the control data if the addresses match and, only if they match, then to transmit data on the cable to the control unit representative of its own status; at least one of the transducers being further configured to determine whether the control data have a predetermined characteristic indicative that they are extended data and, only if so, to respond to a second one of the predetermined start voltage pulses received immediately after the control data and address data to retain in its memory the control data and address data as extended control data and extended address data, and then to respond to a sequence of further control data and further address data (i.e. legacy control data and legacy address data in the examples given below) to compare its own address with the unique address represented by the combination of the further address data and the extended address data and, if and only if they match, to store the extended control data and the further (i.e. legacy) control data, and then to perform the said transmission of data to the control unit and any other process dictated by the extended control data; and the control unit is configured to generate and to transmit the polling signal including the extended control data and the extended address data and to receive and process the data from the transducers that it has thereby addressed.

The presence of extended data is indicative of a high performance network as described below, whilst its absence is indicative of a legacy network.

The invention also provides a transducer configured for use on such a network, the transducer comprising a memory for control data and for its own unique address and being configured to respond to the predetermined start voltage pulse in the polling signal to clear any control data stored in its memory and then to respond to the control data and address data in the polling signal to compare the address data with its own address and to store the control data if the addresses match and, only if they match, then to transmit data on the cable to the control unit representative of its own status; and further configured to determine whether the control data have a predetermined characteristic indicative that they are extended data and, only if so, to respond to a second one of the predetermined start voltage pulses received immediately after the control data and address data to retain in its memory the control data and address data as extended control data and extended address data, and then to respond to a sequence of further control data and further address data to compare its own address with the unique address represented by the combination of the further address data and the extended address data and, if and only if they match, to store the extended control data and the further control data, and then to perform the said transmission of data to the control unit and any other process dictated by the extended control data.

The invention also provides a method of use of such a network.

Networks embodying the present invention can accommodate a substantially larger number of transceiver units than would be the case with only the address data field size of a system disclosed in the abovementioned specification GB2178878A. This is achieved by including the extended address data in a separate field. For example, an extra four bits may be added, allowing sixteen devices in place of a single device on a legacy system.

Further, by allowing for extended control data to be transmitted in the polling signal, more capable and more complex transceiving units may be accommodated. The invention is consistent with allowing the current cable lengths and power delivery characteristics to be maintained; this avoids failure of higher performance transmission units, with legacy transceiver units still functioning correctly. New, higher performance transceiving units may be used in the same network as legacy transceiving units, avoiding the need to replace legacy transceiving units. The higher performance transceiving units may be used on legacy transmission systems, for example as spares for legacy transmission systems and to allow the latest technology high performance transceiving unit to be used on legacy transmission systems to manage false alarms and the like. In principle, the invention would also allow for future transmission system improvements to be introduced, once all the legacy transceiving units have been replaced with the higher performance transmission systems specification units. The systems embodying the invention allow for large scale data transfers to be transmitted without adversely affecting any legacy transceiving units. This for example is achieved by using the extended control data to enable text messaging units and secondary controlling units installed in the high performance transmission system.

In order that the invention may be better understood, a preferred embodiment will now be described with reference to the accompanying schematic drawings, in which.

Figure 1:
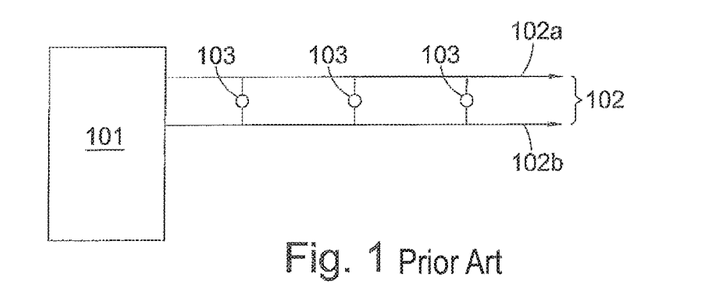
FIG. 1 is a diagram of a control panel connected to transceiver units.

A conventional fire alarm system is shown schematically in FIG. 1, and comprises a control unit 101, also known as a control panel. Several transceiver units 103 are connected across a pair of wires 102a, 102b of a fireproof cable 102, which allow power and digital data to be sent to the transceiver unit and to be received by the control unit from those units.

Figure 2:
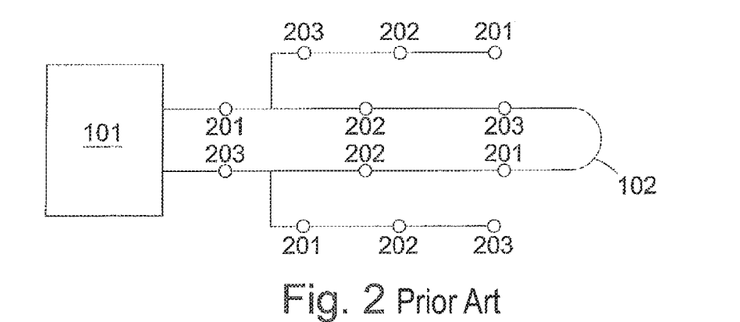
FIG. 2 is a diagram of a legacy system with a cable loop.

A conventional fireproof cable network for use in a building is shown in FIG. 2. Transceiver units 103 can fulfill a number of different functions in the fire alarm system. Legacy sensor transceiver units 201 are used to monitor for fires, legacy signalling transceiver units 202 are used to signal fires to occupants of the building and legacy switching and monitoring transceiver units 203 are used monitor and control fire protection equipment. Legacy devices 201 to 203 are connected across the fireproof cabling 102 of FIG. 1. The cabling 102 comprises a main loop or ring structure with the ability of accommodating spurs, of which two are shown by way of example. The addition of spurs allows the addition of extra devices, and may save cable. A typical network of this type supports up to 126 legacy devices on a network of 3 km of cabling. Each device is located at a different point around a building for the detection of fires and for signalling the presence of a fire to the occupants of the building in accordance with fire regulations.

Figure 3:
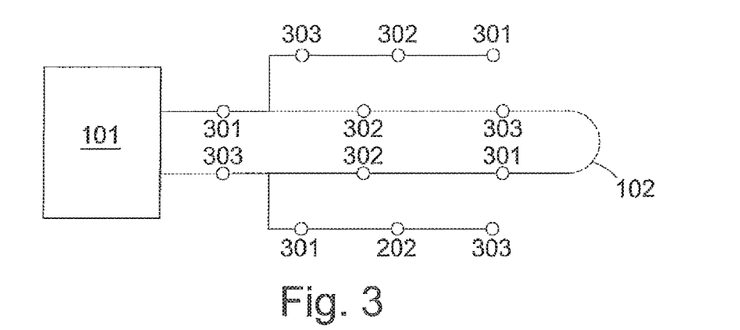
FIG. 3 shows a system embodying the present invention.

A network similar to that of FIG. 2 but fitted with newer, higher performance devices embodying the present invention, is shown in FIG. 3. This higher performance network has an identical topography, allowing legacy devices to be replaced with higher performance devices without any changes in cabling. In this example, the higher performance devices 301, 302, 303 replace respective legacy devices 201, 202 and 203 respectively of FIG. 2. In accordance with the present invention, and as described below, this network is capable of supporting up to 2016 high performance devices, allowing for upgrades and additions to the system without the need for another loop of fireproof cabling to be installed.

Figure 4:
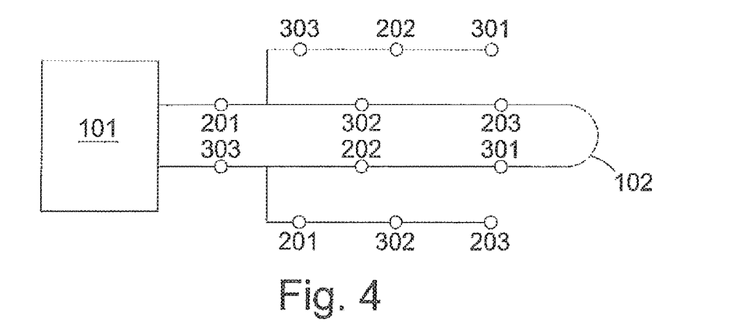
FIG. 4 is a diagram of a system which includes a legacy system and also embodies the present invention.

A mixture of legacy and high performance devices 201, 202, 203; 301, 302, 303 may be included on the same fireproof cabling, as shown in FIG. 4.

This is important because there are many different types of transceiver unit 103 that are compatible with the existing controller units 101. These transceiver units 103 each hold many type approvals throughout the world, and they are made by a number of different manufacturers. It is impractical to update all these products to a new data bus system, i.e. to a system which uses a new polling signal format, at the same time, and so it is important that the present invention enables the use of mixed systems. In FIG. 4, the number of legacy devices is approximately the same as the number of new devices, but any number of each could be mixed together, to a maximum capacity, in this example, of 126 legacy devices or 2016 high performance new devices. In this case, each legacy device that has been fitted has the effect of locking out, i.e. taking up, sixteen high performance device addresses.

Figure 5:
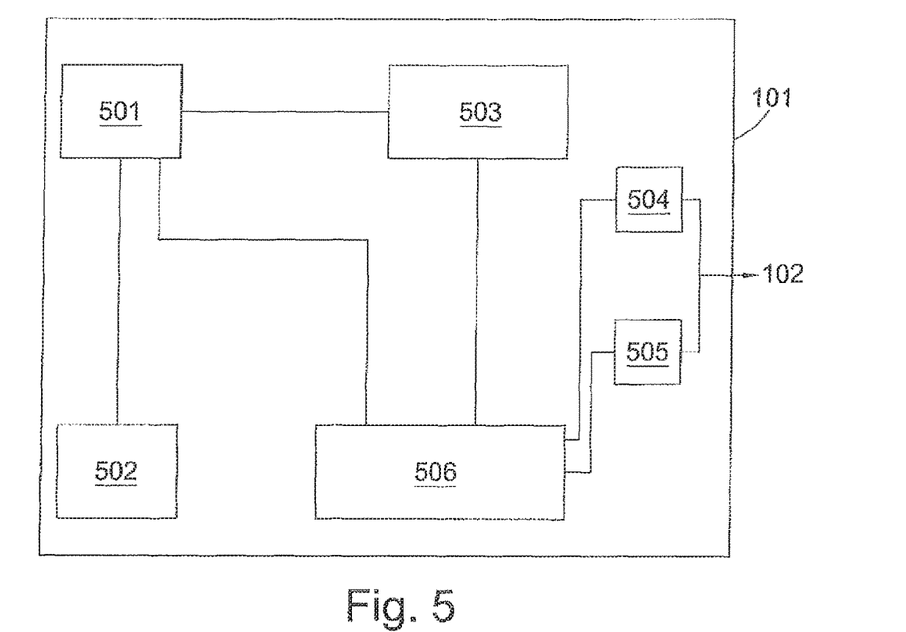
FIG. 5 is a diagram of a fire control panel embodying the invention.

A control unit 101 capable of embodying the present invention is shown in FIG. 5, and it includes a human interface 503 for allowing its status to be observed and for the system to be controlled. The human interface is controlled by a central processing unit 506 which also monitors the fire system status through the communication provided by a voltage modulating circuit 504 and a current pulse monitoring circuit 505. The voltage modulating circuit 504 allows data to be sent to the transceiving units 103, and a current pulse monitoring circuit 505 monitors data received from the transceiving units 103 in the form of current pulses. A memory 502 connected to the central processing unit 506 records the current condition of the transceiver units 103. A power supply 501, typically an enclosed rechargeable battery and battery charging circuit, powers all the circuits of the controller unit 101. The detailed function of the circuits need not be described here, but reference may be taken to those disclosed in our publication GB2178878A mentioned above.

Figure 6:
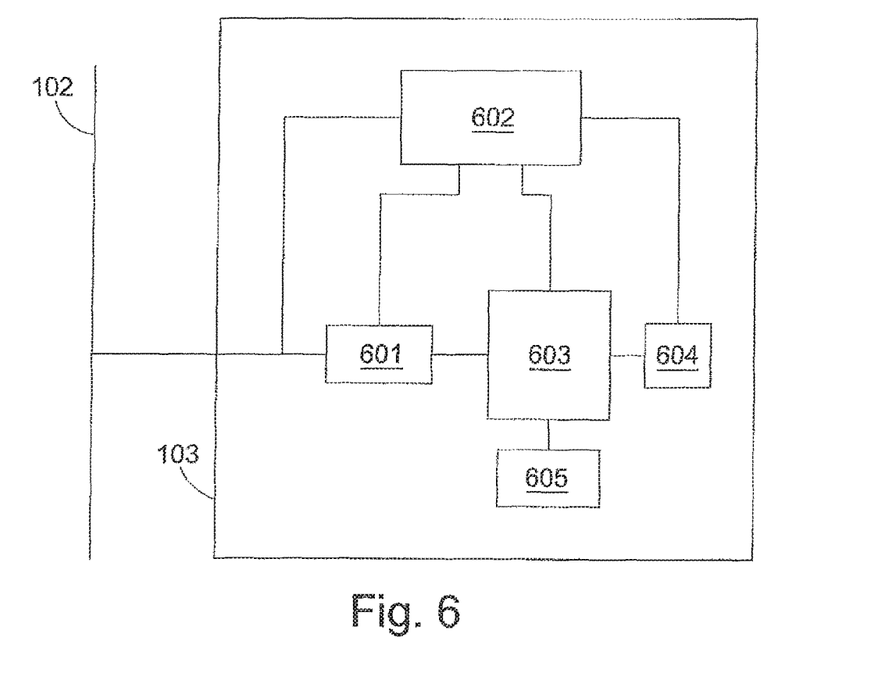
FIG. 6 is a diagram of a transceiver unit embodying the present invention.

A transceiver unit 103 that may embody the present invention is also of the type described in GB2178878A. As shown in FIG. 6, the transceiver unit 103 receives power and data from the controller unit 101 over the fireproof cable 102. It regulates the power it requires with a power supply 602 which in turn supplies power to the other circuits in the transceiver unit 103. Digital data are received and sent by the transceiver unit 103 by means of a line interface circuit 601. The data sent to the bus constituted by the fireproof cable 102 are decoded by a decoding and processing logic circuit 603. The data sent consist of a control message and a device address. The transceiver unit 103 is configured to compare the address to its own unique address set locally in unit 605; if the addresses match, then the transceiver unit responds to the control message and sends a standard status message back along the fireproof cable 102. The status message contains information that is representative of the state of the transceiver unit function enabling circuit 604, such as a local smoke level if the transceiver unit is a smoke detector.

It will be appreciated that the enabling circuit 604 will perform a transducing function depending upon the parameter or event that is being monitored. It may also be a notification or monitoring and switching function in the other classes of transceiving unit 202, 203, 302 and 303.

Figure 7:
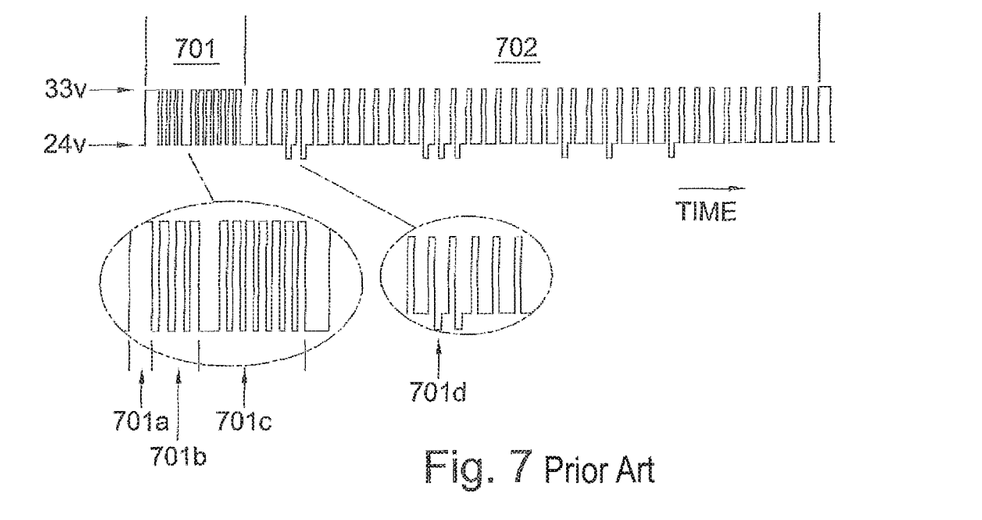
FIG. 7 is a diagram of a polling signal in accordance with a legacy transmission protocol.

A typical polling signal used in legacy systems such as that of GB2178878A is shown in FIG. 7, which shows a train of voltage pulses, in this case substantially rectangular pulses of different lengths, and also a sequence of current pulses. For convenience, the current pulses and the voltage pulses use the same vertical axis. The voltage pulses are those between a voltage level of 24 volts and a voltage level of 33 volts, in this example. The current pulses are transmitted by the transceiver units during respective voltage pulses, and they are triggered by those voltage pulses which act as clock pulses. The current pulses are in effect the priority signals described in GB2178878A which occur in given positions during a sequence of synchronizing pulses in the polling signal.

The control unit 101 creates the voltage pulses in the polling signal shown in FIG. 7, using its voltage modulating circuit 504, over the base voltage of nominally 24 volts. This significant base voltage allows the transceiver unit 103 to harvest power using its power supply 602. The voltage pulses consist of a transmit phase 701, during which the controller unit 101 sends eleven pulses to the transceiver unit; and a receive phase 702, during which the transceiver unit sends its status message back to the controller unit. The status message length is governed by the controller unit which sends a pulse to trigger the next message bit to be transmitted. If the pulse is short the transceiver unit sends the next data bit and if the pulse is long the transceiver unit prepares to receive transmit phase data 701.

Figure 8:
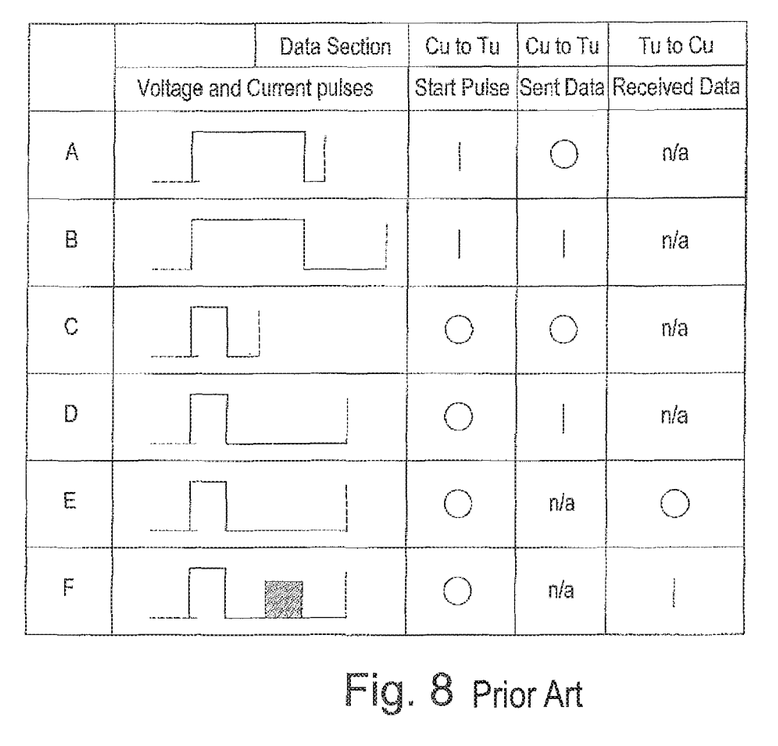
FIG. 8 is a diagram of data decoding on the network of FIG. 3 or FIG. 4.

The encoding of the data of the polling signal and the returned status message is illustrated in FIG. 8, in which a start pulse is sent from the control unit TU, then data are sent the same way, and then data are received as status messages from the transceiver unit to the control unit. The rows a, b, c and d of the Table in FIG. 8 depict decoding in the transceiver unit, whilst rows e and f depict decoding in the control unit. The decoding of a pulse takes account of its width and of the time to the next pulse. The pulse width is decoded as one of two commands, a short pulse is a data bit separator for both sent data and received data and a long pulse signals the start of a message. The time to the next pulse during the transmit phase contains encoded data; it is decoded as a 1 if the time to the next pulse is long and a 0 if the time to the next pulse is short. The time to the next pulse during the data receive phase is constant and similar to the long time to next pulse in the data transmit phase. These timings are decoded for each pulse sequence of a pulse followed by a delay to the next pulse as shown in the Table of FIG. 8. In the Table, a numeral "1" indicates a set data bit, and a numeral "0" represents a reset data bit. During the transmit phase the transceiver units 103 decode a long time between the pulses as a data bit 1 and a short gap between the pulses as a data bit 0. If a long pulse is transmitted the data bit is the first bit of a new message and if the pulse is short the data bit is added onto the current message. During the receive phase 702, the control unit decodes the presence of a current pulse in the correct position (defined by the sequence of clock pulses sent as voltage pulses in the received phase 702) as a data bit 1, and the absence of such a current pulse as a data bit 0.

The control unit first sends a long pulse 701a, which is a predetermined start voltage pulse, and which signals to all devices the start of a message. Next, the control unit sends a sequence of command bits 701b, also known as control data, which have the function of setting or re-setting functions within the transceiver units. For example, transceiving units that are sensors have a visible red indicator light to signal to occupants of the building that the device has signalled an alarm. Finally, the control unit sends the device address 701c which is a unique address for the transceiver unit 103 that is expected to action the corresponding command and to return its status information accordingly.

Having received the message, the transceiver unit compares the address represented by the address bit sequence 701c with its own unique address stored in unit 605, and, if the two are identical, then it accepts the command message and sends its status message as a reply to the control unit.

The control unit then sends a short voltage pulse, within the receive phase 702, to trigger the next bit of data to be sent by the transceiver unit. The data is in the form of a current pulse that is sent within a predetermined time window after the voltage pulse; the absence of the current pulse signals a logic 0, and the presence of the current pulse signals a logic 1. In this manner, the status message can be sent from the transceiver unit to the control unit. The voltage pulse length is important because, as previously described, a long pulse according to 701*a* represents the start of a message sequence, and must be distinguished from the pulses used to trigger the reply message. A long pulse 701*a* may be used at any time in the data frame comprising the transmit phase 701 and the receive phase 702, and whenever it is detected, the transceiver units immediately prepare for the start of a new message by clearing the current message from the decoding logic, i.e. in effect erasing their memory of the previous message.

Figure 9:
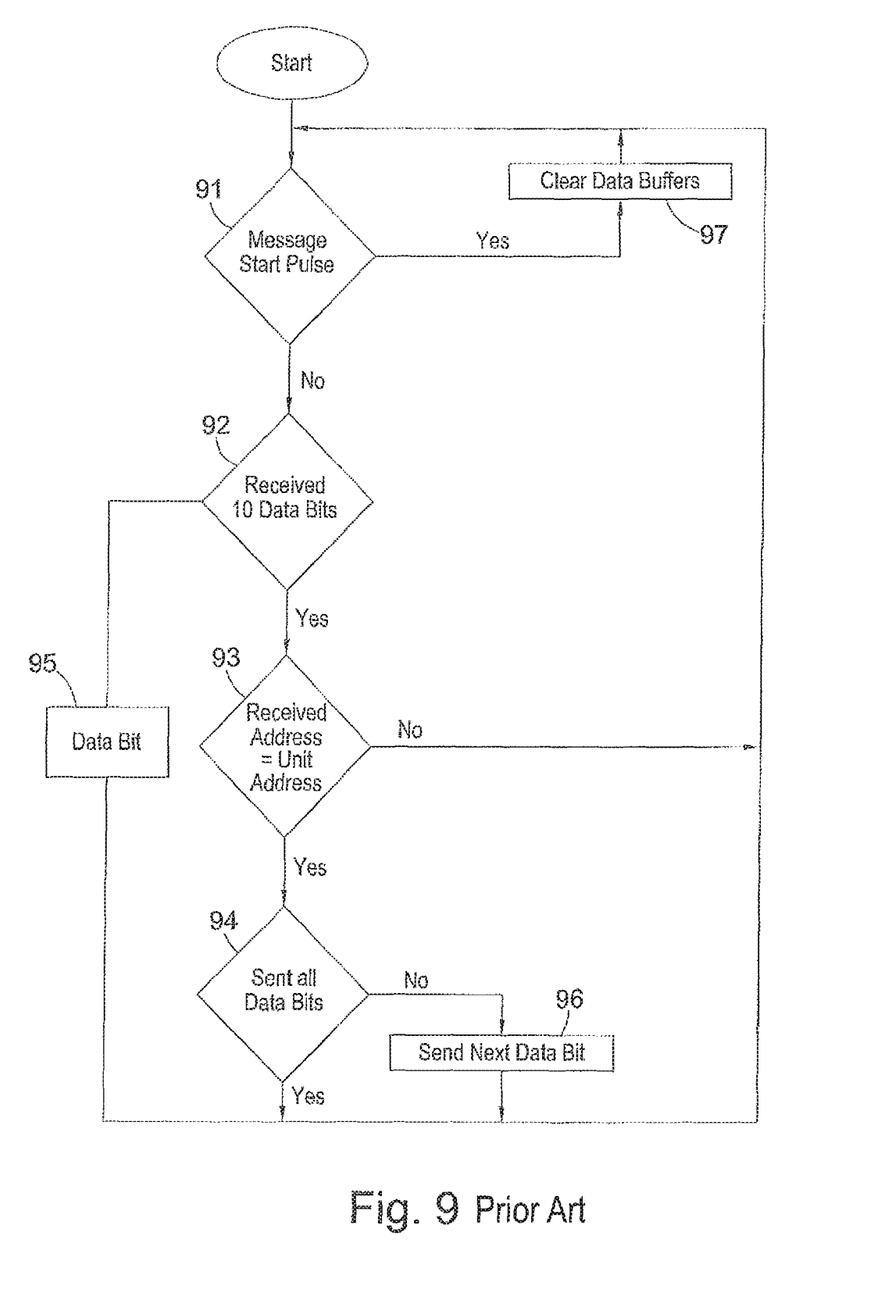
FIG. 9 is a flowchart of the process of decoding a transmission protocol of the type disclosed in GB2178878A.

The conventional decoding process of a typical transceiver unit 201, 202, 203 such as that disclosed in GB2178878A is shown in FIG. 9. The transceiver unit loads the data being sent in accordance with the rules shown in the Table of FIG. 8. If a long pulse is received at any point in the message, the message start is detected in box 91, which causes box 97 to clear the data buffers. Otherwise, the first bit of data is stored in box 95, and subsequent data bits are stored in box 95 until all ten data bits have been received. If then the address represented by the ten data bits, on comparison with the stored address, is a match, then the transceiver unit sends a status data message in box 96, as the sequence of current pulses triggered by the short voltage pulses or clock pulses. These data bits are sent in box 96 until all data bits have been sent, in box 94. When the message is complete, the legacy transceiver unit stops transmitting and waits for the next long pulse.

Figure 10:
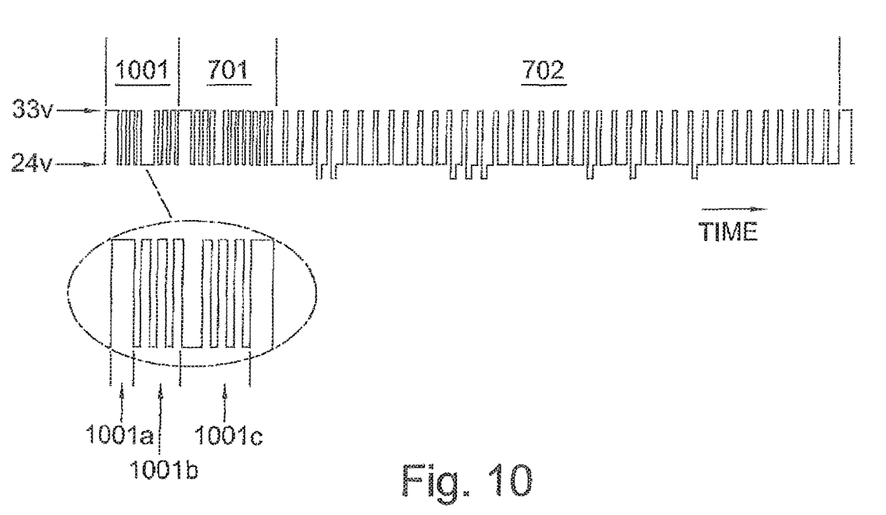
FIG. 10 is a diagram of a polling signal incorporating a transmission protocol in accordance with the present invention.

A polling signal in accordance with the present invention is shown in FIG. 10. This has the same structure of voltage pulses and current pulses as the conventional polling signal shown in FIG. 7, except for the addition of a high performance extension 1001 phase. This extension 1001 is added at the beginning of a legacy transmission system message, and it allows extra information to be transmitted without affecting the legacy transceiver units. The legacy transceiver units decode the start voltage pulse, i.e. the long pulse 701*a* which immediately follows the high performance extension 1001, and this clears the data that were sent in the high performance extension. Each legacy transceiver unit then responds to the legacy data frame 701 and 702 in the normal way, as described above with reference to FIGS. 7, 8 and 9. It does not act upon the data sent in the high performance extension 1001. However, high performance transceiver units, i.e. those embodying the present invention, accept the high performance extension 1001 as valid data, and act upon the extension 1001 as well as the legacy transmitted data in phase 701. In the same way, they transmit status data in the legacy phase 702.

Figure 11:
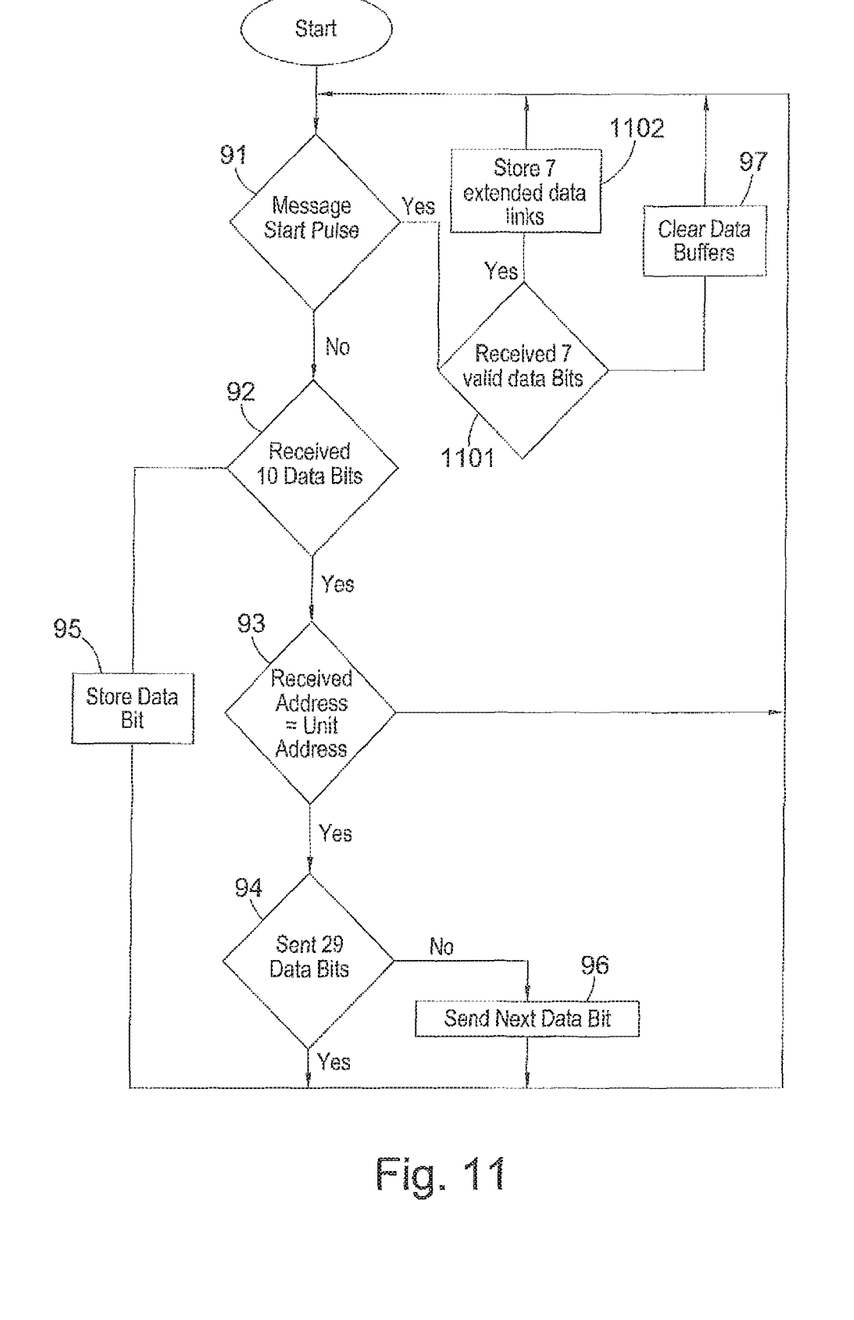
FIG. 11 is a flowchart illustrating the decoding process for a polling signal shown in FIG. 10.

The extra decoding required in the transceiver units in accordance with the invention is shown by way of example in FIG. 11. The extra decoding is represented by the decision box 1101 which checks for a valid high performance transmission header, and stores it if it is valid. This allows the high performance devices to receive the extra seven bits of information contained in 1001 when decoded in accordance with the table in FIG. 8. In this example, the high performance extension phase 1001 comprises the predetermined start voltage pulse 1001*a*, identical to pulse 701*a*; followed by the high performance control data 1001*b* comprising three bits, followed by the extended address information 1001*c* comprising four bits of information.

The control data 1001*b* constitutes a frame type message, which may be one of for example seven different types of message. One type of message may be a legacy message format type, defined as binary 0 in the message 1001*b*. Other types of message may be used to perform high performance transmission system functions. One type of control data 1001*b* comprises data transmitted on the fire system without affecting the high performance transceiver units. Such data may allow the use of display terminals on the system that are used to inform the occupants of the building of the current status and actions that need to be carried out. This may include text signage in the emergency exit routes, informing occupants of the correct escape route. It may include small text units situated around the building that inform staff of the source of the alarm, so that they can act promptly and correctly. This may include the function whereby the high performance transceiver units are able to signal fire alarms even though they have not been asked for the standard status message to be transmitted in the legacy phase 702. Any form of text or graphic or video display may be sent to the terminals on the system in this way, depending on the number of bits allocated in the data frame.

Another form of the frame type message 1001*b* allows large numbers of high performance sensor transceiver units to report their status within the required response times typically required by legislation. This may be by means if an improved message format which compresses the data using modern techniques.

The extended address sequence 1001*c* is used in combination with the legacy address 701*c*, to constitute the unique address. The legacy transceiver units can only act upon the legacy address 701*c*, and accordingly each legacy transceiver unit takes up one legacy message address 701*c*, and ignores any extension. High performance transceiver units, i.e. those embodying the present invention, decode the extended address information 1001*c* together with the legacy address information 701*c*, as secondary and primary addresses respectively. Thus legacy transceiver units respond to all secondary addresses at their internal primary address, and high performance transceiver units respond to the unique combination of their primary and secondary address only.

In one embodiment of the invention, the high performance system enables 2016 devices to be addressed individually in 126 banks of legacy addresses which each contain sixteen high performance addresses. The high performance system could be a hybrid of legacy transceiver units and high performance transceiver units. Up to sixteen high performance devices, in this example, can be used at a single legacy address, but only one legacy device can be used at each legacy address. Thus high performance systems can accommodate legacy products which would have been very expensive to design and approve, without the need to modify them; examples being ATEX products (equipment and protected systems intended for use in potentially explosive atmospheres), flame detectors and beam detectors.

At the same time, transceiver units embodying the present invention are still compatible with legacy networks as well as with high performance networks. High performance transceiver units which receive polling signals of the type shown in FIG. 7 simply use the legacy address 701*c* and do not require the high performance header 1001, and they respond to the polling signal by transmitting the required legacy message. This allows legacy transceiver units to be discontinued from manufacture, with high performance transceiver units being provided as spares for legacy systems.

In another embodiment of the invention is to use the $7^{th}$ bit of the high performance header as a second address for the same high performance transceiver unit 103. This will allow complex high performance transceiver units to transmit data from two addresses thus doubling the information available to the fire control panel regarding the complex high performance transceiver unit's status. The high performance system will in this example have eight pairs of high performance addresses at each of the legacy addresses and the pairs of legacy addresses operate in tandem.

In another embodiment of the invention the high performance sensor transceiver units 301 and the high performance signalling transceiver units 302 can be combined using a pair of tandem addresses described above. In this example the high performance transceiver units 301 automatically respond to the first tandem address and the high performance signalling units 302 automatically respond to the second tandem address thus making it possible to devise a scheme whereby the high performance signalling transceiver units can automatically receive their address from the high performance sensor transceiving units removing the need to do this manually.

The invention claimed is:

1. A wired data communications network for use in a building for the detection of fire or intrusion, comprising:
    a control unit connected by cable to a series of uniquely addressable transducers for the transmission and reception of data in a polling signal, wherein each transducer has a memory for control data and for its own unique address and is configured to respond to one or two predetermined start voltage pulses in the polling signal to clear any control data stored in its memory and then to respond to control data and address data in the polling signal to compare the address data with its own unique address and to store the control data if the addresses match and, only if they match, then to transmit data on the cable to the control unit representative of its own status;
    at least one of the transducers being further configured to determine whether the control data in the polling signal has a predetermined characteristic indicative of extended data and, only if so, to respond to the second one of the predetermined start voltage pulses received immediately after the control data and address data in the polling signal to retain in its memory the control data and address data as extended control data and extended address data, and then to respond to a sequence of further control data and further address data to compare its own unique address with a unique address represented by the combination of the further address data and the extended address data and, if and only if they match, to store the extended control data and the further control data, and then to perform the said transmission of data representative of its own status to the control unit and any other process dictated by the extended control data; and
    the control unit is configured to generate and to transmit the polling signal including the extended control data and the extended address data and to receive and process the data representative of its own status from the transducers that it has thereby addressed.

2. The wired data communication network according to claim 1, wherein each transducer is configured to transmit the data representative of its own status to the control unit as electric current pulses triggered by respective voltage clock pulses constituting the polling signal following the control data and the address data.

3. The wired data communication network according to claim 1, wherein the extended address data comprise the least significant bits of the unique address of the transducer.

4. The wired data communication network according to claim 1, further comprising auxiliary devices on the wired data communication network each with its own unique address, the extended control data comprising data for use by the auxiliary devices.

5. The wired data communication network according to claim 4, in which the auxiliary devices comprise display units and the extended control data in the polling signal comprises text or graphic or video display data for display on the display units.

6. The wired data communication network according to claim 4, in which the auxiliary devices comprise sounders for emitting audio signals in response to the extended control data.

7. The wired data communication network according to claim 4, for use as a fire alarm system in the building, the transducers comprising fire and/or smoke and/or gas detectors.

8. The wired data communication network according to claim 1, wherein at least one of the transducers is not configured to determine whether the control data has the said predetermined characteristic, so that it always clears its memory of the control data in response to each predetermined start voltage pulse, and therefore only carries out the address comparison in response to the second of the predetermined start voltage pulses in the polling signal.

9. A transducer configured for use on a wired data communication network for use in a building for the detection of fire or intrusion, the wired data communication network comprising:
    a control unit connected by cable to a series of uniquely addressable transducers comprising the transducer for the transmission and reception of data in a polling signal, the control unit configured to generate and to transmit the polling signal including control data and address data and to receive and process data representative of a status of the respective transducer from the transducers that it has thereby addressed;
    the transducer comprising a memory for control data and for its own unique address and being configured to respond to one or two predetermined start voltage pulses in the polling signal to clear any control data stored in its memory and then to respond to the control data and address data in the polling signal to compare the address data with its own unique address and to store the control data if the addresses match and, only if they match, then to transmit the data representative of the status on the cable to the control unit; and
    wherein the transducer is further configured to determine whether the control data in the polling signal has a predetermined characteristic indicative of extended data and, only if so, to respond to the second one of the predetermined start voltage pulses received immediately after the control data and address data to retain in its memory the control data and address data as extended control data and extended address data, and then to respond to a sequence of further control data and further address data to compare its own unique address with a unique address represented by the combination of the further address data and the extended address data and, if and only if they match, to store the extended control data and the further control data, and then to perform the said transmission of the data representative of the status to the control unit and any other process dictated by the extended control data.

10. A control unit configured for use on a wired data communication network for use in a building for the detection of fire or intrusion, the wired data communication network comprising:

a series of uniquely addressable transducers connected by cable to the control unit for the transmission and reception of data in a polling signal; and wherein each transducer has a memory for control data and for its own unique address and is configured to respond to one or two predetermined start voltage pulses in the polling signal to clear any control data stored in its memory and then to respond to control data and address data in the polling signal to compare the address data with its own unique address and to store the control data if the addresses match and, only if they match, then to transmit data on the cable to the control unit representative of its own status;

at least one of the transducers being further configured to determine whether the control data in the polling signal has a predetermined characteristic indicative of extended data and, only if so, to respond to the second one of the predetermined start voltage pulses received immediately after the control data and address data in the polling signal to retain in its memory the control data and address data as extended control data and extended address data, and then to respond to a sequence of further control data and further address data to compare its own unique address with a unique address represented by the combination of the further address data and the extended address data and, if and only if they match, to store the extended control data and the further control data, and then to perform the said transmission of data representative of its own status to the control unit and any other process dictated by the extended control data;

the control unit being configured to generate and transmit the polling signal including the extended control data and extended address data and to receive and process the data from the transducers representative of their status that it has thereby addressed.

11. A method of use of a wired data communication network for use in a building for the detection of fire or intrusion, the wired data communication network comprising:

a control unit connected by cable to a series of uniquely addressable transducers for the transmission and reception of data in a polling signal, wherein each transducer has a memory for control data and for its own unique address and is configured to respond to one or two predetermined start voltage pulses in the polling signal to clear any control data stored in its memory and then to respond to control data and address data in the polling signal to compare the address data with its own unique address and to store the control data if the addresses match and, only if they match, then to transmit data on the cable to the control unit representative of its own status;

at least one of the transducers being further configured to determine whether the control data in the polling signal has a predetermined characteristic indicative of extended data and, only if so, to respond to the second one of the predetermined start voltage pulses received immediately after the control data and address data in the polling signal to retain in its memory the control data and address data as extended control data and extended address data, and then to respond to a sequence of further control data and further address data to compare its own unique address with a unique address represented by the combination of the further address data and the extended address data and, if and only if they match, to store the extended control data and the further control data, and then to perform the said transmission of data representative of its own status to the control unit and any other process dictated by the extended control data; and the control unit being configured to generate and transmit the polling signal including the extended control data and extended address data and to receive and process the data from the transducers representative of their status that it has thereby addressed;

the method comprising the control unit generating the polling signal including the control data and the address data and transmitting the polling signal on the cable, and the at least one of the transducers determining whether the control data has the predetermined characteristic indicative of the extended data and, only if so, responding to the second one of the predetermined start voltage pulses received immediately after the control data and address data to retain in its memory the control data and address data as the extended control data and the extended address data, and then responding to the sequence of the further control data and the further address data to compare its own unique address with the unique address represented by the combination of the further address data and the extended address data and, if and only if they match, storing the extended control data and the further control data, and then performing the said transmission of data representative of its own status to the control unit and any other process dictated by the extended control data.

12. A method of use of a wired data communication network for use in a building for the detection of fire or intrusion, the wired data communication network comprising:

a control unit connected by cable to a series of uniquely addressable transducers for the transmission and reception of data in a polling signal, wherein each transducer has a memory for control data and for its own unique address and is configured to respond to one or two predetermined start voltage pulses in the polling signal to clear any control data stored in its memory and then to respond to control data and address data in the polling signal to compare the address data with its own unique address and to store the control data if the addresses match and, only if they match, then to transmit data on the cable to the control unit representative of its own status;

at least one of the transducers being further configured to determine whether the control data in the polling signal has a predetermined characteristic indicative of extended data and, only if so, to respond to the second one of the predetermined start voltage pulses received immediately after the control data and address data in the polling signal to retain in its memory the control data and address data as extended control data and extended address data, and then to respond to a sequence of further control data and further address data to compare its own unique address with a unique address represented by the combination of the further address data and the extended address data and, if and only if they match, to store the extended control data and the further control data, and then to perform the said transmission of data representative of its own status to the control unit and any other process dictated by the extended control data; and the control unit being configured to generate and transmit the polling signal including the extended control data and the extended address data and to receive and process the data from the transducers representative of their own status that it has thereby addressed;

wherein at least one of the transducers is not configured to determine whether the control data has the said predetermined characteristic;

the method comprising the said at least one transducer which is not configured to determine whether the control data has the said predetermined characteristic clearing its memory of the address data and control data in response to each predetermined start voltage pulse and therefore only carrying out the address comparison in response to the second of the predetermined start voltage pulses in the polling signal.

\* \* \* \* \*